(12) United States Patent
Tan et al.

(10) Patent No.: US 9,445,432 B2
(45) Date of Patent: Sep. 13, 2016

(54) FINE-GRAINED CHANNEL ACCESS IN WIRELESS NETWORKS

(75) Inventors: Kun Tan, Beijing (CN); Jiansong Zhang, Beijing (CN); Yongguang Zhang, Beijing (CN); Ji Fang, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 585 days.

(21) Appl. No.: 12/824,104

(22) Filed: Jun. 25, 2010

(65) Prior Publication Data

US 2011/0317633 A1    Dec. 29, 2011

(51) Int. Cl.
| | |
|---|---|
| H04W 74/08 | (2009.01) |
| H04L 27/26 | (2006.01) |
| H04W 72/00 | (2009.01) |
| H04W 72/04 | (2009.01) |
| H04W 84/12 | (2009.01) |

(52) U.S. Cl.
CPC .......... *H04W 74/08* (2013.01); *H04L 27/2607* (2013.01); *H04W 72/00* (2013.01); *H04W 72/044* (2013.01); *H04W 84/12* (2013.01)

(58) Field of Classification Search
CPC .......... H04W 16/14; H04W 72/0406–72/042; H04W 72/0453; H04W 72/121; H04W 72/1247; H04W 74/002–74/006; H04W 74/04–74/06
USPC ................................ 370/276–281, 329, 338
See application file for complete search history.

(56) References Cited

U.S. PATENT DOCUMENTS

| | | | |
|---|---|---|---|
| 4,210,780 A | 7/1980 | Hopkins et al. | |
| 7,876,840 B2 * | 1/2011 | Tong et al. | 375/260 |
| 8,218,420 B2 * | 7/2012 | Chong et al. | 370/203 |
| 2003/0026200 A1 | 2/2003 | Fu | |
| 2003/0123383 A1 * | 7/2003 | Korobkov et al. | 370/208 |
| 2005/0130684 A1 | 6/2005 | Kim | |
| 2005/0237989 A1 | 10/2005 | Ahn | |
| 2008/0130519 A1 * | 6/2008 | Bahl et al. | 370/254 |
| 2008/0225778 A1 * | 9/2008 | Vare et al. | 370/328 |
| 2008/0232487 A1 * | 9/2008 | Cleveland et al. | 375/260 |

(Continued)

OTHER PUBLICATIONS

Brodersen, R. W., A. Wolisz, D. Cabric, S. M. Mishra, D. Willkomm, Corvus: A cognitive radio approach for usage of virtual unlicensed spectrum, Berkeley Wireless Research Center (BWRC) White paper, Jul. 2004, pp. 1-21.

(Continued)

*Primary Examiner* — Pao Sinkantarakorn
(74) *Attorney, Agent, or Firm* — Sandy Swain; Micky Minhas

(57) ABSTRACT

A fine-grained channel access system and method to facilitate fine-grained channel access in a high-data rate wideband wireless local-area network (WLAN). Embodiments of the system and method divide an entire wireless channel into proper size subchannels commensurate with the physical layer data rate and typical frame size. Once the subchannels are defined, each node on the WLAN contends independently for each of the fine-grained subchannels. A first orthogonal frequency-division multiplexing (OFDM) technique is used to signal an access point on the WLAN that the node desires one or more of the subchannels. A second OFDM technique (which is different from the first OFDM technique) is used for data transmission. Sometimes there is contention between nodes that want the same subchannel. The access point resolves any contention between the nodes using a frequency domain contention technique that includes a frequency domain backoff technique.

20 Claims, 9 Drawing Sheets

(56) References Cited

U.S. PATENT DOCUMENTS

| | | | | |
|---|---|---|---|---|
| 2008/0240275 | A1* | 10/2008 | Cai | 375/260 |
| 2009/0122771 | A1* | 5/2009 | Cai | 370/338 |
| 2009/0232071 | A1* | 9/2009 | Cho et al. | 370/329 |
| 2009/0290552 | A1* | 11/2009 | Bertorelle | 370/329 |
| 2010/0046454 | A1* | 2/2010 | Wentink | 370/329 |
| 2010/0142458 | A1* | 6/2010 | Mark | 370/329 |
| 2010/0165942 | A1* | 7/2010 | Liao et al. | 370/329 |
| 2010/0208712 | A1* | 8/2010 | Wax et al. | 370/338 |
| 2010/0220674 | A1* | 9/2010 | Fu | 370/329 |
| 2011/0038324 | A1* | 2/2011 | Park et al. | 370/329 |
| 2011/0110351 | A1* | 5/2011 | Seok | 370/338 |
| 2011/0128900 | A1* | 6/2011 | Seok | 370/311 |
| 2011/0222521 | A1* | 9/2011 | Lee et al. | 370/338 |
| 2012/0002575 | A1* | 1/2012 | Noh et al. | 370/280 |

OTHER PUBLICATIONS

Chandra, R., R. Mahajan, T. Moscibroda, R. Raghavendra, P. Bahl, A case for adapting channel width in wireless networks, Proc. of the ACM SIGCOMM 2008 Conf. on Applications, Technologies, Architectures, and Protocols for Comp. Communications, SIGCOMM 2008, Aug. 17-22, 2008, pp. 135-146, Seattle, WA, USA.

Dutta, A., D. Saha, D. Grunwald, D. C. Sicker, Smack: A SMart ACKnowledgment scheme for broadcast messages in wireless networks, Proc. of the ACM SIGCOMM 2009 Conf. on Applications, Technologies, Architectures, and Protocols for Comp. Communications, SIGCOMM 2009, Aug. 17-21, 2009, pp. 15-26, Barcelona, Spain.

Elson, J., L. Girod, D. Estrin, Fine-grained network time synchronization using reference broadcasts, Proc. of the 5th Symposium on Operating System Design and Implementation, OSDI 2002, Dec. 9-11, 2002, Boston, Massachusetts, USA.

Guha, S., A. Reznichenko, K. Tang, H. Haddadi, P. Francis, Serving ads from localhost for performance, privacy, and profit, Proc. of the 8th Workshop on Hot Topics in Networks, HotNets 2009, Oct. 2009, New York City, NY.

Haas, Z. J., J. Deng, Dual busy tone multiple access (DBTMA)—A multiple access control scheme for ad hoc networks, IEEE Transactions on Communications, Jun. 2002, pp. 975-985, vol. 50, No. 6.

Han, T., X. Li, J. Lee, Smart random channel access in OFDM systems by joint signal processing and packet scheduling, Int'l J. of Comp. Science and Network Security, Aug. 2005, vol. 5, No. 8.

He, Y., R. Yuan, J. Sun, W. Gong, Semi-random backoff: Towards resource reservation for channel access in wireless LANs, Proc. of the 17th Annual IEEE Int'l Conf. on Network Protocols, ICNP 2009, Oct. 13-19, 2009, pp. 21-30, Princeton, NJ, USA.

Heusse, M., F. Rousseau, R. Guillier, A. Duda, Idle sense: An optimal access method for high throughput and fairness in rate diverse wireless LANs, Proc. of the ACM SIGCOMM 2005 Conf. on Applications, Technologies, Architectures, and Protocols for Comp. Communications, SIGCOMM 2005, Aug. 22-26, 2005, pp. 121-132, Philadelphia, Pennsylvania, USA.

Kim, B.-S., S. W. Kim, R. L. Ekl, OFDMA-based reliable multicasting MAC protocol for WLANs, IEEE Transactions on Vehicular Technology, Sep. 2008, pp. 3136-3145, vol. 57, No. 5.

Kivanc, D., G. Li, H. Liu, Computationally efficient bandwidth allocation and power control for OFDMA, IEEE Transactions on Wireless Communications, Nov. 2003, pp. 1150-1158, vol. 2, No. 6.

Kleinrock, L, F. A. Tobagi, Packet switching in radio channels: Part I—Carrier sense multiple-access modes and their throughput-delay characteristics, IEEE Trans. on Comm., Dec. 1975, vol. COM-23, No. 12, pp. 1400-1416.

Kotz, D., K. Essien, Analysis of a campus-wide wireless network, Wireless Networks, Jan. 2005, vol. 11, No. 1-2, pp. 115-133.

Liu, X., E. K. P. Chong, N. B. Shroff, Opportunistic transmission scheduling with resource-sharing constraints in wireless networks, IEEE J. on Selected Areas in Communications, Oct. 2001, pp. 2053-2064, vol. 19, No. 10.

Mo, J., H.-S. W. So, J. C. Walrand, Comparison of multichannel MAC protocols, IEEE Trans. Mobile Computing, Jan. 2008, pp. 50-65, vol. 7, No. 1.

Rahul, H., F. Edalat, D. Katabi, C. Sodini, Frequency-aware rate adaptation and MAC protocols, Proc. of the 15th Annual Int'l Conf. on Mobile Computing and Networking, MOBICOM 2009, Sep. 20-25, 2009, pp. 193-204, Beijing, China.

Rahul, H., N. Kushman, D. Katabi, C. Sodini, F. Edalat, Learning to share: Narrowband-friendly wideband networks, Proc. of the ACM SIGCOMM 2008 Conf. on Applications, Technologies, Architectures, and Protocols for Computer Communications, SIGCOMM 2008, Aug. 17-22, 2008, pp. 147-158, Seattle, WA, USA.

Roman, B., F. Stajano, I. J. Wassell, D. N. Cottingham, Multi-carrier burst contention (MCBC): Scalable medium access control for wireless networks, IEEE Wireless Communications & Networking Conference, WCNC 2008, Mar. 31, 2008-Apr. 3, 2008, pp. 1667-1672, Las Vegas, Nevada, USA.

Shen, Z., J. G. Andrews, B. L. Evans, Adaptive resource allocation in multiuser OFDM systems with proportional rate constraints, IEEE Transactions on Wireless Communications, Nov. 2005, pp. 2726-2737, vol. 4, No. 6.

Shin, S., H. Schulzrinne, Experimental measurement of the capacity for VoIP traffic in IEEE 802.11 WLANs, 26th IEEE Int'l Conf. on Comp. Communications, Joint Conf. of the IEEE Comp. and Communications Societies, INFOCOM 2007, May 6-12, 2007, pp. 2018-2026, Anchorage, Alaska, USA.

Shrivastava, V., S. K. Rayanchu, J. Yoonj, S. Banerjee, 802.11n under the microscope, Proc. of the 8th ACM SIGCOMM Conf. on Internet Measurement, Oct. 20-22, 2008, pp. 105-110, Vouliagmeni, Greece.

Sinha, R., C. Papadopoulos, J. Heidemann, Internet packet size distributions: Some observations, Technical Report ISI-TR-2007-643, USC/Information Sciences Institute, May 2007, originally released Oct. 2005 as web page http://netweb.usc.edu/rsinha/pkt-sizes/, pp. 7.

Tan, K., J. Zhang, J. Fang, H. Liu, Y. Ye, S. Wang, Y. Zhang, H. Wu, W. Wang, G. M. Voelker, Sora: High performance software radio using general purpose multi-core processors, Proc. of the 6th USENIX Symposium on Networked Systems Design and Implementation, NSDI 2009, Apr. 22-24, 2009, pp. 75-90, Boston, MA, USA.

Tang, Q., S. K. S. Gupta, L. Schwiebert, BER performance analysis of an on-off keying based minimum energy coding for energy constrained wireless sensor application, 2005 IEEE Int'l Conf. on Communications, ICC 2005, May 16-20, 2005, pp. 2734-2738, vol. 4.

Verkaik, P., Y. Agarwal, R. Gupta, A. C. Snoeren, Softspeak: Making VoIP play well in existing 802.11 deployments, Proc. of the 6th USENIX Symposium on Networked Systems Design and Implementation, NSDI 2009, Apr. 22-24, 2009, pp. 409-422, Boston, MA, USA.

IEEE Standard 802.11 ac: Very High Throughput; Jul. 2009; 29 pages.

IEEE Standard 802.11n: Part 11: Amendment 5: Enhancements for Higher Throughput; Oct. 29, 2009; 536 pages.

IEEE Standard 802.16: Part 16: Air Interface for Fixed Broadband Wireless Access Systems; Oct. 1, 2004; 893 pages.

3GPP TS 36.201-820: Evolved universal terrestrial radio access (E-UTRA); long term evolution (LTE) physical layer; general description; Dec. 2, 2008; 14 pages.

Tan, K. et al.; "Fine-grained Channel Access in Wireless LAN"; SIGCOMM Comput. Commun. Rev. 41, No. 4; Aug. 2010; pp. 147-158.

TSE, David, and Pramod Viswanath, "Fundamentals of Wireless Communication," Cambridge University Press, 2005, 564 pages.

Proakis, John G., and Masoud Salehi, "Digital Communication," McGraw-Hill, 2008, 1150 pages.

Goldsmith, Andrea, "Wireless Communications," Cambridge University Press, 2005, 644 pages.

* cited by examiner

FINE-GRAINED CHANNEL ACCESS IN WIRELESS NETWORKS

BACKGROUND

A wireless local-area networks (WLAN) links devices using a wireless distribution method (such as orthogonal frequency-division multiplexing (OFDM)). A WLAN allows users to move around an area serviced by the WLAN while still maintaining interconnectivity. For this reason WLANS have become increasingly popular with consumers both in the home and in commercial and public areas.

Improvements in communication technology drive the increase of wireless data rate in wireless local area networks (WLANs). For example, the latest ratified Institute of Electrical and Electronics Engineers (IEEE) 802.11n standard has boosted the physical layer (PHY) data rate to hundreds of megabytes per second (Mbps). The physical layer is the first and lowest layer in the seven-layer Open System Interconnection (OSI) model of computer networking.

The increase in the data rate in the PHY is mainly due to wider channel bandwidth and advanced modulation techniques like Multiple-Input Multiple-Output (MIMO). Future standards like the IEEE 802.11 ac standard and the 802.11ad standard are already poised to provide even faster PHY speeds on the order of gigabytes per second (Gbps).

However, the throughput efficiency, which is the ratio between the network throughput and the PHY data rate, has degraded rapidly as the PHY data rate has increased. One reason for this is the inadequacy of current IEEE 802.11 medium access control (MAC) data communication protocol. The MAC is a sublayer of the data link layer, which is the second layer of the OSI networking model. For example, given that most internet protocol (IP) packets have a maximal transmit unit (MTU) size around of 1500 bytes, the efficiency ratio in an 802.11n network at 300 Mbps is around twenty percent. In other words, the 300 Mbps data rate can sustain an actual throughput of only about 60 Mbps.

One reason for such inefficiency is that the current MAC data communication protocol allocates the entire channel as a single unit. Such allocation can become too coarse grained when the channel width increases or PHY data rate increases. Even if a sender has a small amount of data to send the data still has to compete for the whole channel. The time spent resolving this contention for the channel therefore becomes an overhead to the useful channel time. Unfortunately, this overhead cannot be easily reduced due to physical and electronics constraints. As a result, the higher the PHY data rate the lower the throughput efficiency.

Attempts have been made to deal with this lack of WLAN efficiency. One way to improve efficiency is to extend the useful channel time on data transmission by sending larger frames. Indeed, the IEEE 802.11n standard allows frame aggregation (or sending multiple frames together). However, when the PHY data rate goes up the aggregated frame size needs to go up as well. This means to achieve an efficiency of eighty percent in a 300 Mbps network it would require the frames to be as big as 23 KB. This means longer delays as the sender waits to collect enough frames before actual transmission, which adversely affects transport control protocol (TCP), real-time applications like voice over IP (VoIP), video conferencing, and to web browsing. Indeed, tests have shown that a network throughput of 300 Mbps an 802.11n network can only increase to around 80 Mbps after frame aggregation is enabled.

One way to improve WLAN efficiency is by reducing the channel width and creating additional channels. Each node in the network may transmit on these small channels simultaneously, thereby amortizing MAC coordination overhead among multiple users. One problem, however, with this idea is that it is difficult to slice a channel band into multiple subchannels without losing useful bandwidth.

One common practice in creating subchannels is to waste both edges of two adjacent subchannels as "guard band" so that the useful transmissions are properly spaced out to avoid interfering with each other. However, these guard bands can add up to significant overhead, especially as the number of subchannels increase. Moreover, no matter the width of a subchannel the guard-band width cannot be easily reduced due to the power mask requirement.

In order to avoid the need for guard bands, some WLANs use the orthogonal frequency division multiplexing (OFDM) wireless distribution method. OFDM is a well understood PHY-layer technology that works best if the frequency and width of subchannels are strategically picked and transmission on each subchannel is synchronized in a way to become "orthogonal" (and thus non-interfering) to one another. Although some cellular networks have proposed to use OFDM in channel multi-access (OFDMA), it requires tight synchronization among user handsets and it does not support random access. It thus remains a technical challenge on how to use OFDM-type channelization for dividing a channel into subchannels among distributed and asynchronous stations in a random-access WLAN, where it is impractical and unnecessary to achieve the same tight synchronization.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the fine-grained channel access system and method facilitate fine-grained channel access in a high-data rate wide-band wireless local-area network (WLAN). Embodiments of the system and method are designed to enable fine-grained subchannel random access based on orthogonal frequency-division multiplexing (OFDM). Embodiments of the system and method are a cross-layer design that addresses challenges in both the physical layer (PHY) and the media access control layer (MAC) design due to the asynchronous and distributed nature of WLANs.

Embodiments of the system and method take an entire wireless channel and divide the whole channel width into proper size subchannels commensurate with PHY data rate and typical frame size. When OFDM is used to eliminate the interchannel guard-bands, one challenge is how to coordinate the transmissions as WLAN is distributed and asynchronous in nature. First, embodiments of the system and method use a new PHY architecture based on OFDM that retains orthogonality among subchannels by solely relying on the coordination mechanisms in existing WLANs (such as carrier-sensing and broadcasting). Second, embodiments of the system and method employ a frequency-domain contention technique that uses physical layer request-to-send/clear-to-send (RTS/CTS) signaling and frequency domain backoff to efficiently coordinate the subchannel access.

More specifically, embodiments of the system and method take a wireless channel and divide the channel into multiple fine-grained subchannels. Then each node on the WLAN contends independently for each of the fine-grained subchannels. A first OFDM technique is used to signal an access point in the WLAN that the node desires one or more of the subchannels. This first OFDM technique uses a first fast Fourier transform (FFT) size.

Each node then simultaneously transmits a multi-tone RTS (M-RTS) signal to the access point by using the first OFDM technique. Sometimes more than one node will desire the same subchannel, and this will cause contention among the nodes. The access point resolves any contention between the nodes using a frequency domain contention technique that includes a frequency domain backoff technique. Once any contention is resolved by the access point, the access point then assigns each node one or more of the subchannels.

A second OFDM technique (which is different from the first OFDM technique used for signaling) is used for data transmission. This second OFDM technique uses a second FFT size for transmitting data on each node's assigned subchannels. In addition, embodiments of the system and method employ two different guard times to handle symbol time misalignment of the asynchronous signaling and the data transmission over the fine-grained subchannels. One of the guard times uses a short cyclic prefix while the other guard time uses a long cyclic prefix (as compared to each other).

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of embodiments of the fine-grained channel access system and method reference is made to the accompanying drawings, which form a part thereof, and in which is shown by way of illustration a specific example whereby embodiments of the fine-grained channel access system and method may be practiced. It is to be understood that other embodiments may be utilized and structural changes may be made without departing from the scope of the claimed subject matter.

I. System Overview

Figure 1:
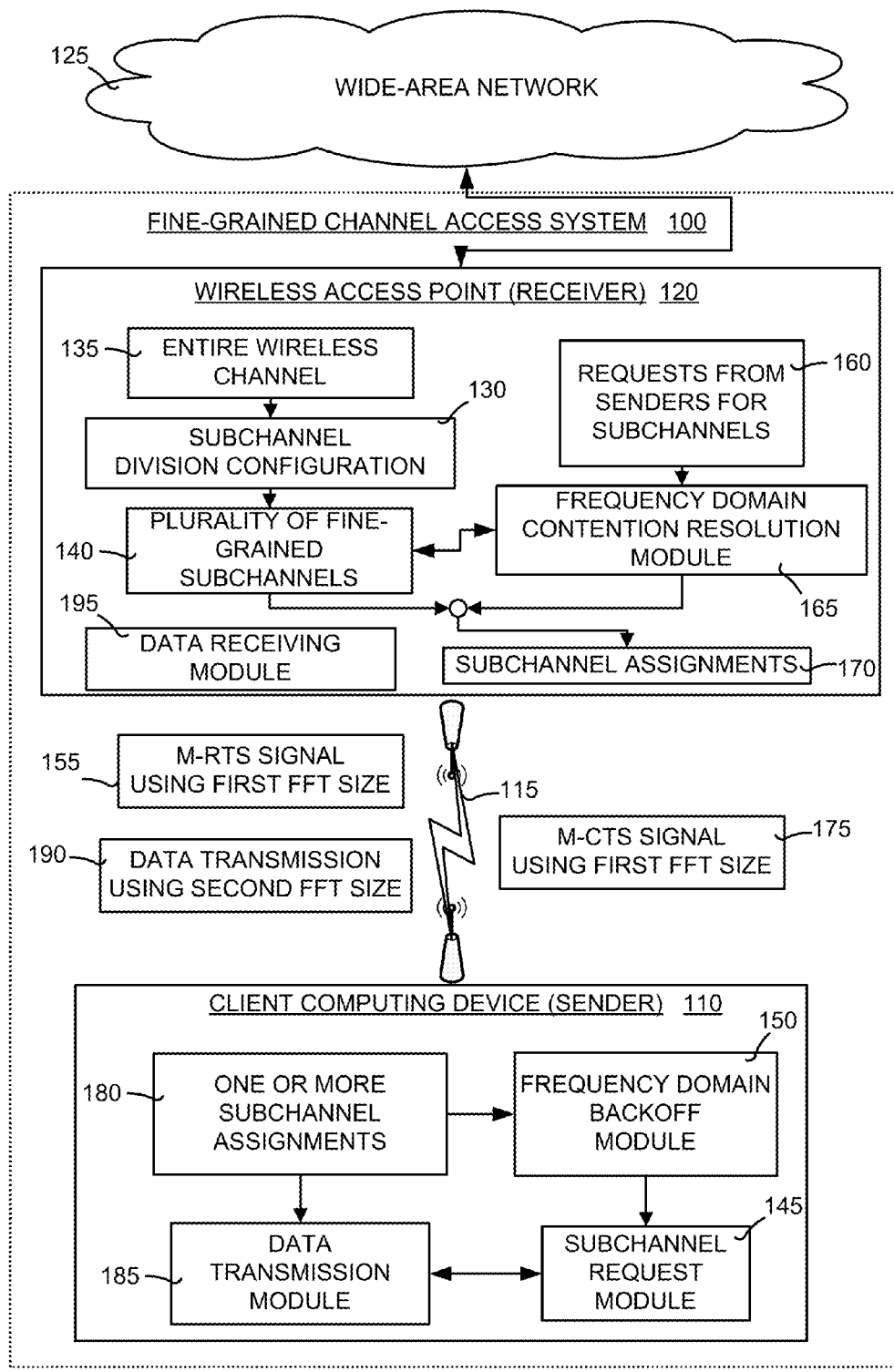
FIG. 1 is a block diagram illustrating a general overview of embodiments of the fine-grained channel access system and method implemented in a wireless computer network.

FIG. 1 is a block diagram illustrating a general overview of embodiments of the fine-grained channel access system 100 and method implemented in a wireless computer network. The wireless computer network is a wireless local-area network (WLAN) and includes at least one client computing device 110 or node, which acts as a sender. It should be noted that although only one client computing device 110 is shown in FIG. 1 for the sake of simplicity, typically there are several computing or processing devices that belong to the WLAN.

The client computing device 110 is in wireless communication 115 with a wireless access point (AP) 120, which acts as a receiver in embodiments of the system 100 and method. In turn, the AP 120 typically is in communication with a wide-area network 125 (such as the Internet). The communication parts in embodiments of the fine-grained channel access system 100 agree on spectrum channel allocation and subchannel division schemes, as shown within the AP 120 of FIG. 1. In particular, the AP 120 includes a subchannel division configuration 130. Based on the configuration 130 an entire wireless channel 135 is divided or separated into a plurality of fine-grained subchannels 140.

It should be noted that FIG. 1 illustrates the embodiments of the fine-grained channel access system 100 by taking the client computing device 110 (or node) as a sender and the AP 120 as a receiver. For the sake of simplicity, in the client computing device 110 only modules for sending are shown and in the AP 120 only modules for receiving are shown. It should be noted that in embodiments of the fine grained channel access system 100 the AP 120 and the client computing device 110 run symmetric protocols. This means that they contain the same functional modules.

When the client computing device 110 has frames to transmit, a subchannel request module 145 residing on the client computing device 110 generates subchannel access requests based on the frame size and an output of a frequency domain backoff module 150. The subchannel request module 145 performs carrier sense on the entire wireless channel 135 and when the channel 135 is sensed idle the module 145 sends a multi-tone request to send (M-RTS) signal to the AP 120. This M-RTS carries the subchannel access request using a first fast Fourier transform (FFT) size 155.

The AP 120 receives requests from client nodes (including the client computing device 110) for subchannels access 160. These concurrent requests may contend for each of the subchannels. The AP 120 resolves the contention with a frequency domain contention resolution module 165 that deals with contention between nodes that are requesting the same subchannel. Subchannels are assigned to node by the module 165, and then the AP 120 sends out the subchannel assignments for the nodes 170 to the respective nodes using a multi-tone clear-to-send (M-CTS) 175 using the first FFT size.

The client computing device 110 is one of the nodes that receives one or more subchannel assignments 180 (depending on the number of subchannels requested). Using the one or more subchannels assigned to it, a node (such as the client computing device 110) can send data. Embodiments of the fine-grained channel access system 100 and method facilitate receipt and transmission of data using a data transmission module 185. The data transmission module 185 transmits using a second FFT size 190. The transmitted data are received by a data receiving module 195 located on the AP 120. If the data is received correctly an acknowledgement (ACK) signal is sent from the AP 120 back to the client computing device 110.

II. Operational Overview

Figure 2:
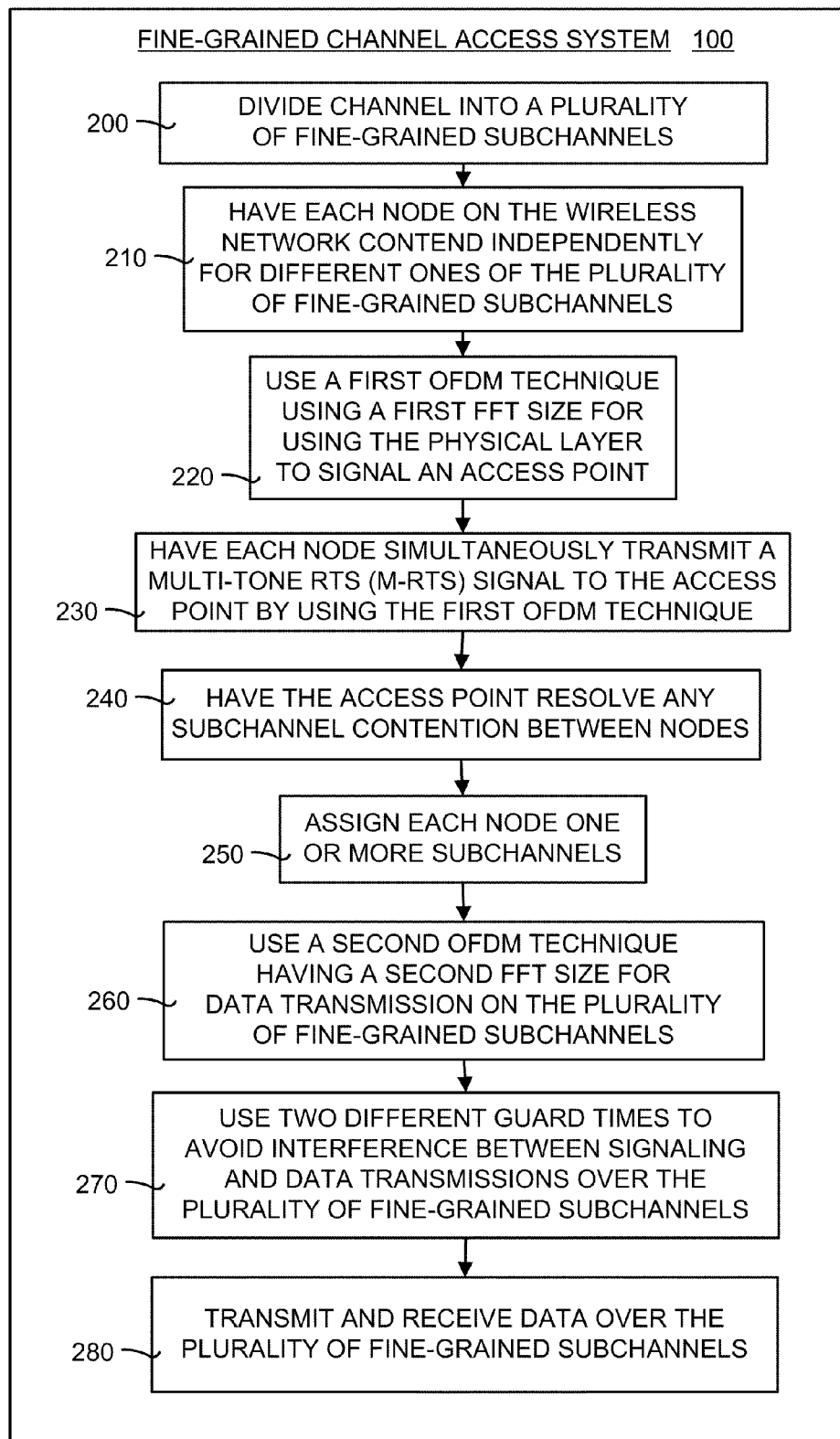
FIG. 2 is a flow diagram illustrating the general operation of embodiments of the fine-grained channel access system shown in FIG. 1.

FIG. 2 is a flow diagram illustrating the general operation of embodiments of the fine-grained channel access system 100 shown in FIG. 1. In particular, embodiments of the system 100 and method divide an entire wireless channel into a plurality of fine-grained subchannels (box 200). This division is commensurate with a physical layer (PHY) data rate and a typical frame size. Next, each node on the wireless network contends independently for different subchannels of the fine-grained subchannels (box 210).

As explained in detail below, a new transmission opportunity appears only when the entire channel is idle. At that time each station tries to contend for different subchannels after the channel is idle for a certain amount of time. This is based on a distributed coordination function interframe space (DIFS).

Embodiments of the system 100 and method then use a first orthogonal frequency-division multiplexing (OFDM) technique using a first fast Fourier transform (FFT) size to signal the access point (AP) 120 (box 220). This is done at the physical layer of the OSI model. Each node transmits a specially-designed OFDM symbol (called Multi-tone RTS or M-RTS signal) to the AP 120 by using the first OFDM technique (box 230). The M-RTS signal is discussed in detail below. This M-RTS signal has embedded therein each node's contention information in a set of subcarriers for each subchannel that the node intends to access.

All M-RTS signals are resolved at the AP 120. In addition, the AP 120 resolves any subchannel contention between nodes (box 240). Any contention between the nodes is resolved using a frequency domain contention technique that includes a frequency domain backoff technique. The AP 120 then broadcasts the contention results in a corresponding multi-tone clear-to-send (M-CTS) OFDM signaling symbol. Then only the nodes assigned subchannels will use them for data transmissions. Each node is assigned one or more subchannels (box 250). Note that a node may contend for multiple subchannels based on its instantaneous traffic demands. The AP 120 will then generate an acknowledgement on each subchannel where a data frame has been successfully decoded.

Embodiments of the fine-grained channel access system 100 and method also use a second OFDM technique having a second FFT size for data transmission on the plurality of fine-grained subchannels (box 260). In addition, two different guard times are used in order to avoid inter-subchannel interference among asynchronous signaling and data transmissions over the subchannels (box 270) from different senders. These two different guard times are discussed in detail below. Embodiments of the system 100 and method then are able to transmit and receive data over the plurality of fine-grained subchannels (box 280).

Figure 3:
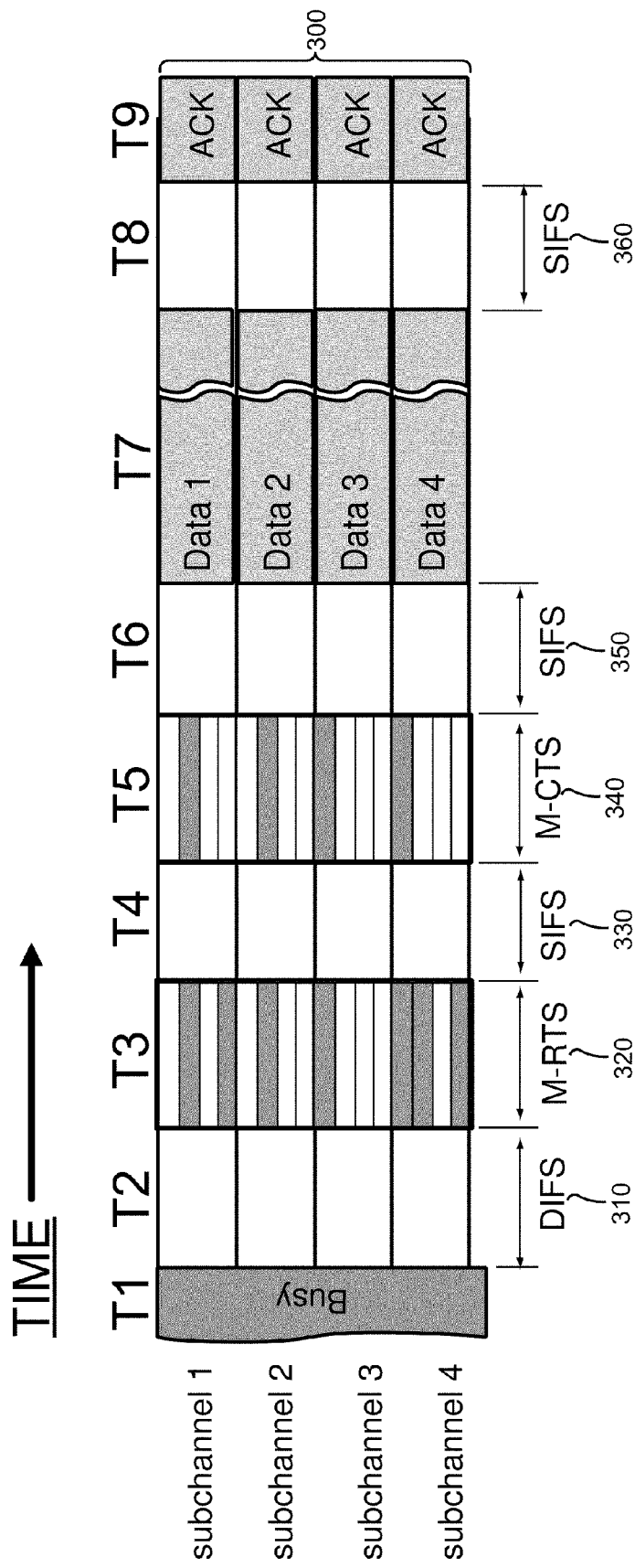
FIG. 3 illustrates a diagram of uplink access where there are multiple senders of embodiments of the system and method shown in FIGS. 1 and 2.

FIG. 3 illustrates a diagram of uplink access where there are multiple senders of embodiments of the system 100 and method shown in FIGS. 1 and 2. In particular, an entire wireless channel 300 shown in FIG. 3 is divided into four subchannels. Note that time is increasing when going from left to right across FIG. 3. At time T1 the whole wireless channel 300 is busy. At time T2 the whole wireless channel 300 is idle for a period of time that is based on DIFS 310. After this period of idleness, a new transmission opportunity appears. Each of the nodes on the wireless network tries to contend for different subchannels At time T3 each of the nodes will transmit a modified RTS signal simultaneously. This RTS signal is a specially-designed OFDM symbol and is called a Multi-tone RTS (M-RTS) 320. Each node embeds its contention information in a set of subcarriers for each of the four subchannels that it intends to access.

At time T4 there is a first short interframe space (SIFS) 330 delay. All M-RTS signals are resolved at the AP 120, and at time T5 the AP 120 will broadcast the contention results in a corresponding M-CTS 340 OFDM signaling symbol. At time T6 there is a second SIFS 350 delay. Then at time T7 only the nodes assigned subchannels will use those assigned subchannels for data transmissions. Note that a node may contend for multiple subchannels based on its instantaneous traffic demands. At time T8 there is another there is a third SIFS 360 delay. Then at time T9 the AP 120 will generate an acknowledgement (ACK) on each subchannel where a data frame has been successfully decoded.

Downlink transmissions follow similar steps, but the AP 120 will initiate an M-RTS signal and receiving stations may return M-CTS. However, since embodiments of the fine-grained channel access system 100 and method do not use random time backoff, it needs to separate uplink and downlink transmissions. Otherwise, collisions would happen under bi-directional traffic. Embodiments of the system 100 and method do so by assigning different DIFS times to uplink and downlink transmissions, as described in detail below.

III. System and Operational Details

Embodiments of the fine-grained channel access system 100 and method are a cross-layer design that enables fine-grained channel access in high-rate wide-band WLAN. Embodiments of the system 100 and method are based on OFDM and divide a wide-band channel into a set of orthogonal subchannels where different nodes can contend for each subchannel individually. For the sake of clarity, this document first assumes a scenario that includes a single access point and multiple mobile stations or nodes. It is straightforward to extend embodiments of the fine-grained channel access system 100 and method to the multi-access point access point case. Also, while in the following discussion a 20-MHz channel is primarily used as an example to explain the operation of embodiments of the fine-grained channel access system 100 and method, it should be noted that embodiments of the system 100 and method are of a scalable design that works for arbitrarily wide channel bands.

III.A. Subchannel Division Configuration

Figure 4:
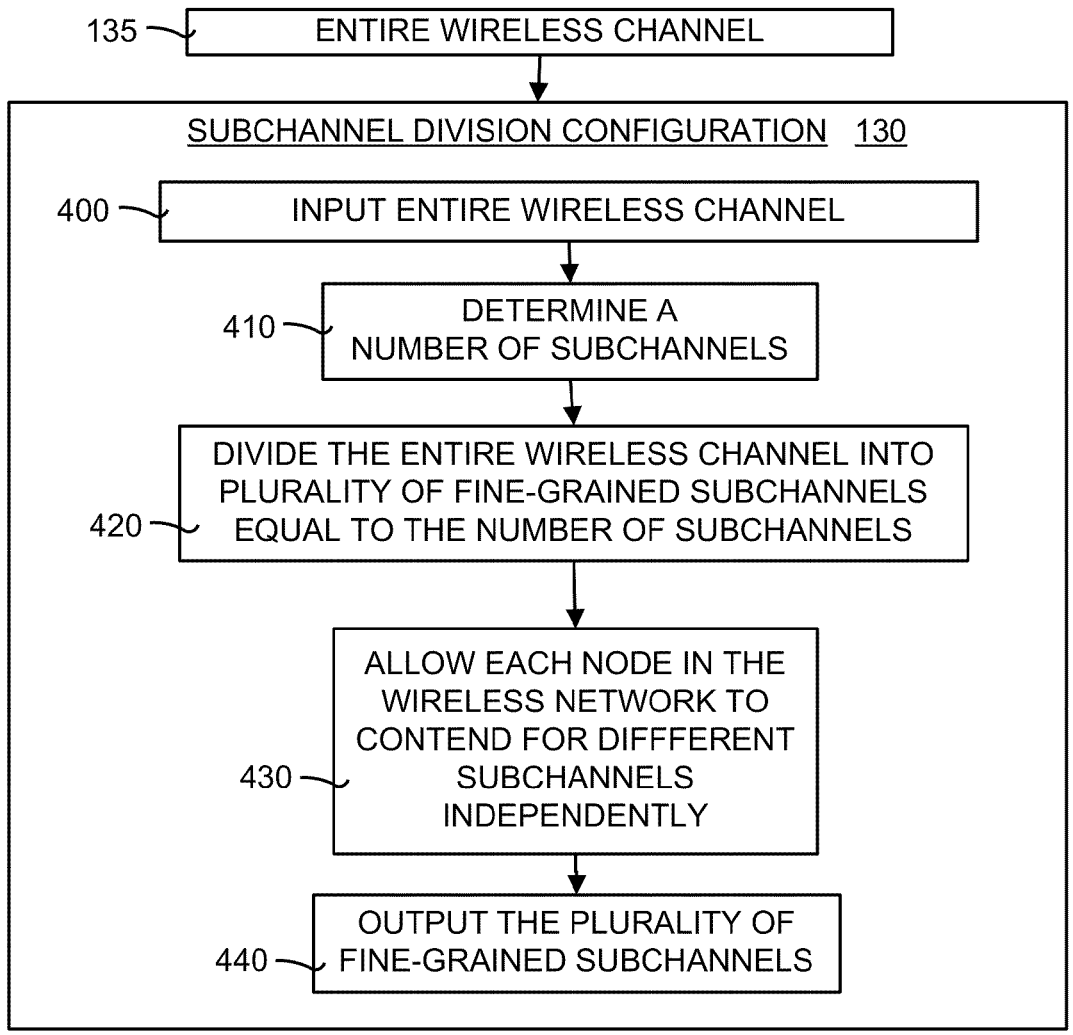
FIG. 4 is a flow diagram illustrating the operational details of embodiments of the subchannel division configuration shown in FIG. 1.

The AP 120 contains a subchannel division configuration 130. FIG. 4 is a flow diagram illustrating the operational details of embodiments of the subchannel division configuration shown in FIG. 1. The input to the subchannel division configuration 130 is an entire wireless channel 135. The operation of embodiments of the configuration 130 begins by inputting the entire wireless channel (box 400). Next, a number of desired subchannels is determined (box 410). In some embodiments of the configuration 130, this determination is made by the system 100, while in alternate embodiments of the configuration 130 the determination is made by a user.

Embodiments of the configuration 130 then divide the entire wireless channel 135 into a plurality of fine-grained subchannels that are equal in number to the number of subchannels determined earlier (box 420). Moreover, embodiments of the configuration 130 allow each node in the wireless network to contend for different subchannels independently (box 430). The output of the configuration 130 is a plurality of fine-grained subchannels (box 440).

III.B. Subchannel Request Module

Figure 5:
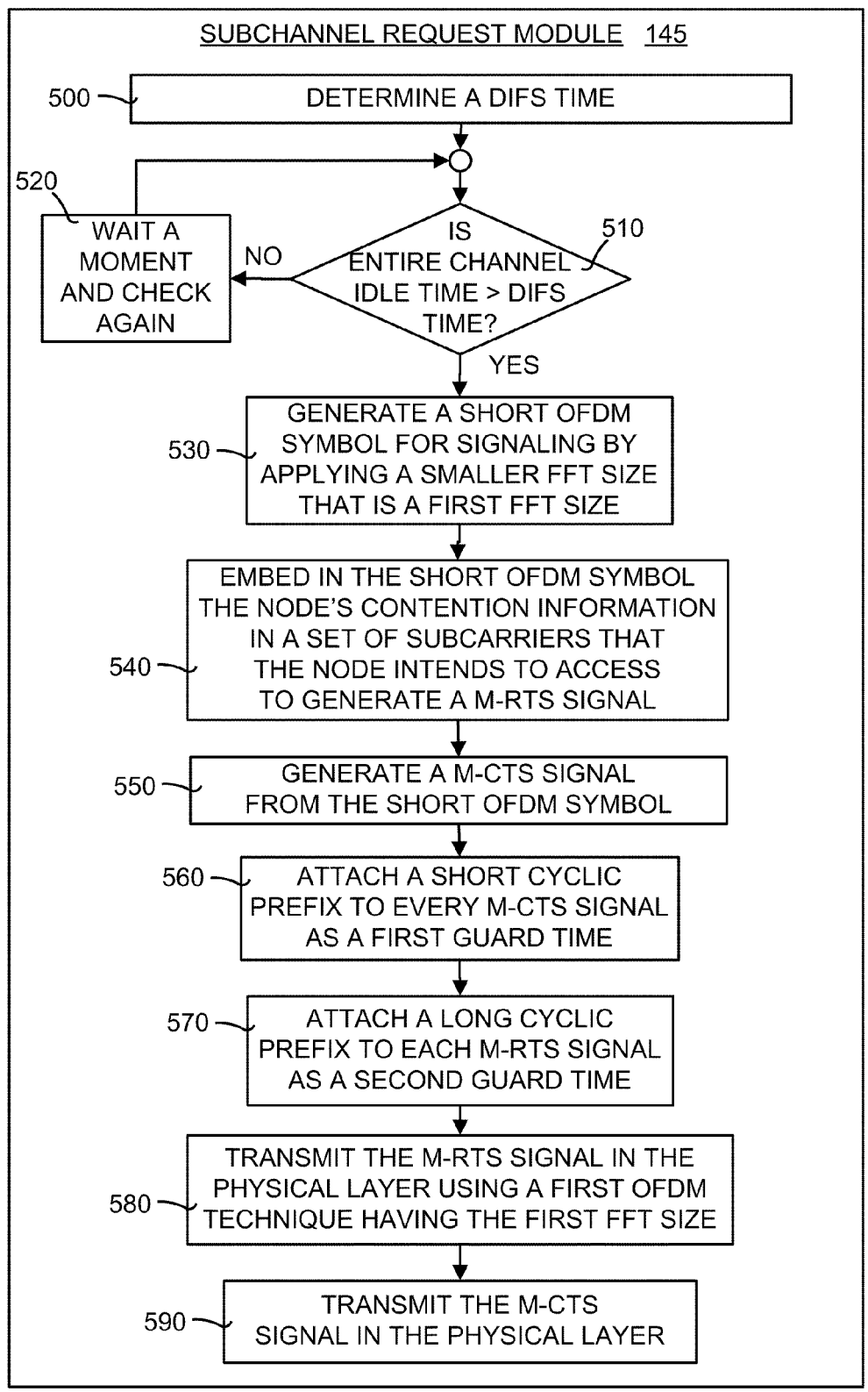
FIG. 5 is a flow diagram illustrating the operational details of embodiments of the subchannel request module shown in FIG. 1.

The client computing device 110 (as well as other nodes) contains a subchannel request module 145. FIG. 5 is a flow diagram illustrating the operational details of embodiments of the subchannel request module 145 shown in FIG. 1. The operation of embodiments of the module 145 begin by determine a distributed coordination function interframe space (DIFS) time (box 500). Next, a determination is made as to whether an entire channel has been idle for more than the DIFS time (box 510). If not, then embodiments of the module 145 wait a moment and then check the idleness status again (box 520).

Otherwise, embodiments of the module 145 generate a short orthogonal frequency-division multiplexing (OFDM) symbol for signaling by applying a smaller fast Fourier transform (FFT) that is a first FFT size (box 530). This first FFT size is smaller as compared to the second FFT size, which is described below.

Embodiments of the module 145 then embed in the short OFDM symbol the node's contention information (box 540). This embedded information is embedded in a set of subcarriers that the node intends to access to generate a M-RTS signal. Moreover, a M-CTS signal is generated from the short OFDM symbol (box 550).

Embodiments of the module 145 attach a short cyclic prefix to every M-CTS signal that acts as a first guard time (box 560). A long cyclic prefix is attached to each M-RTS signal to act as a second guard time (box 570). Embodiments of the module 145 transmit the M-RTS signal in the physical layer (PHY) using a first OFDM technique having a first FFT size (box 580). In addition, the M-CTS signal is transmitted in the physical layer as necessary (box 590). The operation of the signaling module 145 now will be discussed in further detail.

III.B.1. Symbol Timing Misalignment in WLAN

This section presents an analysis of the symbol timing misalignment problem in a carrier sense multiple access (CSMA)-based WLAN. Based on this analysis, the next section describes the PHY structure of embodiments of the fine-grained channel access system 100 and method.

In a WLAN, transmissions from distributed nodes are coordinated based on carrier-sensing and overhearing broadcast frames (such as RTS/CTS). Unlike conventional MACs that use these mechanisms to avoid simultaneous transmissions, embodiments of the fine-grained channel access system 100 and method exploit simultaneous transmissions to enable concurrent access from different nodes but in orthogonal subchannels.

In embodiments of the fine-grained channel access system 100 and method, carrier-sensing coordinates the transmissions of M-RTS. After they sense an idle channel for a fixed DIFS time, two nodes A and B may transmit their M-RTS symbols simultaneously. However, since there is frequently a delay to sense the channel and for a signal to propagate from one node to another, these two M-RTS symbols cannot be transmitted and received at exactly the same time.

In a worst case scenario of the symbol timing difference of two such M-RTS symbols received by the AP, assume that node A senses the channel idle for tdifs seconds, and then node A transmits M-RTS first. It will take at most tprop for the signal to arrive at node B. However, it may take node B at least tcca time to reliably sense the busy channel. If the signal arrives at node B after node B starts a sensing slot, then node B may not be able to assess a busy channel. Note that is does depend on the way in which the node implements the carrier-sensing and threshold setting, but remember the worst case is being considered.

Continuing with the worst-case scenario, after the sensing slot, node B still declares an idle channel and sends its M-RTS as well. The radio signal of node B's M-RTS is actually emitted after tRxTx. And it will take at most another tprop for the M-RTS to arrive at the AP. The total misaligned time is characterized by the following equation, where the bound is tight at the worst case:

$$t_{err\_rts} \leq t_{cca} + t_{RxTx} + 2 \times t_{prop}. \quad (1)$$

Depending on the values of the parameters, it is possible that terr rts can be as large as 11 µs.

If coordination is performed by overhearing a broadcast frame (such as M-CTS or DATA), the timing misalignment can be shorter because the two senders can be synchronized by a reference broadcast. In a worst-case scenario of symbol timing misalignment of data frames after receiving a M-CTS broadcast, assume that the jitter for a local timer can be neglected since the waiting time is usually very small (about a few microseconds). In this case, the timing misalignment is bounded by twice the propagation time. This is shown in the following equation, where terr is about 2 µs in a WLAN environment:

$$t_{err} \leq 2 \times t_{prop}. \quad (2)$$

III.B.2. PHY Architecture

Based on the analysis in last subsection, embodiments of the fine-grained channel access system 100 and method need to provide a guard time long enough to handle the symbol timing misalignment in a WLAN based on carrier sensing and broadcasting. This guard time can be as large as 11 µs if coordination is done with carrier sensing, or 2 µs if transmissions are synchronized by a preceding broadcast. In addition, an additional 800 ns guard time can be included for typical spreading delay in indoor environments. Embodiments of the fine-grained channel access system 100 and method include two guard-time sizes. Some embodiments include a long cyclic prefix (CP) of 11.8 µs and a short CP of 2.8 µs. The long CP is attached to M-RTS only, while a short CP is attached to every M-CTS, DATA, and ACK OFDM symbols, and therefore is the major overhead of concern.

To amortize the short CP overhead a longer OFDM symbol for data is desirable. A longer OFDM symbol is achieved by applying a larger FFT size N. Although in theory one can choose any large FFT size N, there are a few practical considerations. First, a large N requires more computational power to calculate the transform as the complexity of FFT is O(N log(N)). Second, with large N the adjacent subcarriers are spaced very closely. Therefore, it is more sensitive to the error in frequency setting of distributed nodes. Distributed nodes typically have some small frequency offset (a few hundred Hz). Thus, the adjacent subcarriers ideally have enough separation to accommodate such an offset. In practice, subcarriers are usually separated by at least 15 KHz.

In some embodiments of the fine-grained channel access system 100 and method, the FFT size of the DATA OFDM symbol is selected to be 256 in a 20 MHz channel. Moreover, in some embodiments its FFT period is 12.8 μs, and this yields a cyclic-prefix overhead of 18%, which is comparable to the CP overhead of the IEEE 802.11 standard (which is 20%). ACK symbols have the same structure as DATA symbols. M-RTS and M-CTS have a larger FFT size (such as 512-point) because they are signaling symbols that use a low modulation rate, and embodiments of the system 100 and method need slightly more subcarriers to embed control information.

In principle, embodiments of the fine-grained channel access system 100 and method can allocate each subcarrier independently to give maximal flexibility. However, in practice it is difficult for a node to use only a single subcarrier to transmit data for two practical reasons. First, using only one subcarrier means frequency selective fading. If that subcarrier encounters deep fading, then all data will be lost. Thus, it is desirable for a wireless PHY to code across multiple subcarriers to achieve spectrum diversity gain. Second, although a preamble may be used for channel estimation and compensation, the wireless channel may change during the period of data transmission. For high modulation rates, it is desirable for the receiver to track the changes in the wireless channel. This tracking is typically done by adding an additional training subcarrier (or pilot) along with other data subcarriers.

Therefore, embodiments of the fine-grained channel access system 100 and method group a set of subcarriers which are not necessarily contiguous) into a subchannel and uses it as the basis for channel access. Each subchannel contains sixteen data subcarriers and one pilot subcarrier. Thus, in some embodiments of the system 100 and method a single subchannel is 1.33 MHz wide with 6% pilot overhead (which is comparable to the IEED 802.11 standard (7%).

With different modulation modes, the PHY data rate of a single subchannel can range from 512 Kbps to 20.25 Mbps. The lowest data rate is achieved with BPSK, ½ coding on each data subcarrier; while the highest data rate is achieved by applying 64QAM, ⅚ coding and four spatial multiplexing streams on four antennas. With a 1.33 MHz subchannel, a 20 MHz 802.11 channel contains 14 orthogonal subchannels. The remainder of the spectrum is used as guard-bands separating adjacent wide-band channels.

It is also straightforward for embodiments of the system 100 and method to support wider band channels, such as 40-100 MHz or wider. For example, to support a 40 MHz channel, embodiments of the system 100 and method double the FFT size for all OFDM symbols. Since the sampling rate is also doubled the symbol period does not change. When using a 40 MHz channel, the guard-bands that would be ideal to separate two 20 MHz channels can be saved. Thus, embodiments of the system 100 and method can have 29 orthogonal subchannels with 40 MHz. Even though embodiments of the fine-grained channel access system 100 and method have slightly lower data rates than the IEEE 802.11n standard, the effective throughputs are actually dramatically higher due to diminished overheads.

III.B.3. M-RTS/M-CTS Format

Some embodiments of the fine-grained channel access system 100 and method perform subcarrier allocation by having MRTS and M-CTS symbols use a 512-point FFT size in a 20 MHz channel. Wider channels use a proportionally longer FFT point size, and reduce the number and therefore overhead of guard-bands. For example, with a 40 MHz channel, some embodiments of the system 100 and method uses a 1024-point FFT size with nearly half the number of guard-bands. In order to explain this format each band will be explained by using a 20 MHz channel as an example.

III.B.3.i. Tag Band

The tag band contains a predefined binary sequence to identify the type of this OFDM symbol. The tag band is interleaved on selected subcarriers whose indexes are a multiple of four. Thus, the tag band creates a repeating pattern in time-domain samples. The receiver can use this pattern to detect the symbol using correlation. In a 20 MHz channel, the tag band contains 32 subcarriers. For M-RTS, the tag sequence starts with zero, {0, 1, 0, 1, . . . , 0, 1}, while for M-CTS the sequence becomes {1, 0, 1, . . . , 0, 1, 0}.

III.B.3.ii. Contention Band and Resolution Band

In M-RTS, sixteen subcarriers are allocated to each subchannel for contention. So, a total of 224 subcarriers are allocated for a contention band for all 14 subchannels arbitrated using an M-RTS symbol. Contention results are embedded in the resolution band in M-CTS.

The resolution band occupies more subcarriers compared to the contention band in the M-RTS. There are 24 subcarriers for each subchannel. However, since BAM is less robust compared to phase-shift keying modulation (such as BPSK), BAM's reliability can be improved by replicating on multiple subcarriers and using soft-decoding. It can be shown that by replicating twice, BAM can achieve the same performance of BPSK. In some embodiments of the fine-grained channel access system 100 and method, four-time replication is used when high reliability is required.

With four-time replication only six bits are allowed to carry the resolution results. Currently, six bits can represent the winner number (1-16) and two other special states. If these 6 bits are all zero it means the subchannel is not used and no node has contended for this subchannel. Alternately, if the bits are all ones, then the subchannel is reserved by the receiver. In this case no transmission is allowed on this subchannel during the contention period.

III.B.3.iii. Receiver Band

The receiver band contains the hash vector for intended receivers. In some embodiments of the fine-grained channel access system 100 and method, the hash vector contains 40 bits and each bit again is replicated four times for reliability. So the total number of subcarriers used is 160.

III.B.3.iv. Network Allocation Vector (NAV) Band

The network allocation vector (NAV) band encodes the expected number of OFDM symbols in the following data frame. Some embodiments of the fine-grained channel access system 100 and method contains 64 subcarriers. Due four times replication, the actual bits that can be modulated are 16. There are several ways to encode the data symbol number in the NAV band. One technique is to use each single bit to present a certain number of OFDM symbols. Thus, sixteen bits can present numbers between 3 to 48, with a step of 3 OFDM symbols. In a M-CTS, only the highest bit is echoed back and all nodes that overhear the M-CTS defer their contention for a corresponding period.

III.C. Data Transmission Module

Figure 6:
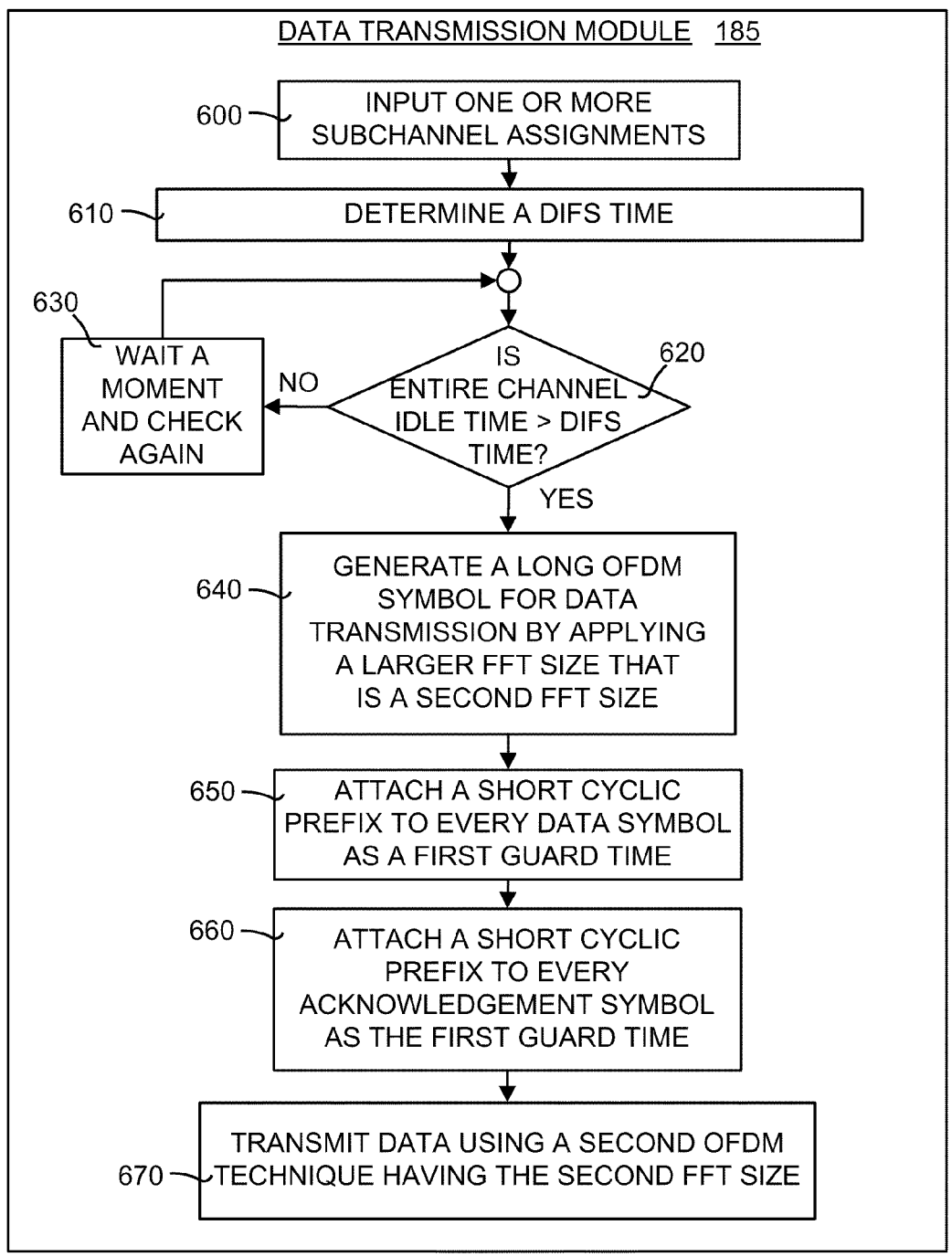
FIG. 6 is a flow diagram illustrating the operational details of embodiments of the data transmission module shown in FIG. 1.

Embodiments of the fine-grained channel access system 100 and method include the data transmission module 185. FIG. 6 is a flow diagram illustrating the operational details of embodiments of the data transmission module 185 shown in FIG. 1. Operation begins by inputting one or more subchannel assignments (box 600). Next, a DIFS time is determined (box 610).

Embodiments of the module 185 then make a determination as to whether the entire channel has been idle for more than the DIFS time (box 620). If not, then embodiments of the module 185 wait a moment and check again (box 630). If so, then embodiments of the module 185 generate a long OFDM symbol for data transmission by applying a larger FFT size that is a second FFT size (box 640). The second FFT size is larger as compared to the first FFT size, described above.

Embodiments of the module 185 then attach a short cyclic prefix to every data symbol to act as the first guard time (box 650). Moreover, the short cyclic prefix is attached to every acknowledgement symbol to also act as the first guard time (box 660). Embodiments of the module 185 than transmit data using a second OFMD technique having the second FFT size (box 670).

III.D. Frequency Domain Contention Module

Embodiments of the fine-grained channel access system 100 and method use the M-RTS/M-CTS signal exchange to avoid collisions in each subchannel. M-RTS/M-CTS are specially-designed OFDM symbols. M-RTS/M-CTS use simple Binary Amplitude Modulation (BAM) to modulate a single bit on each subchannel. Specifically, BAM maps a binary "0" to zero amplitude in a subcarrier, and it uses a random complex on the unit circle ($e^{j\theta}$) to represent binary "1". This modulation is also known as On-Off Keying. BAM can be easily detected at the receiver by comparing the energy on a subcarrier against a threshold, without the need to recover the symbol phase.

Figure 7:
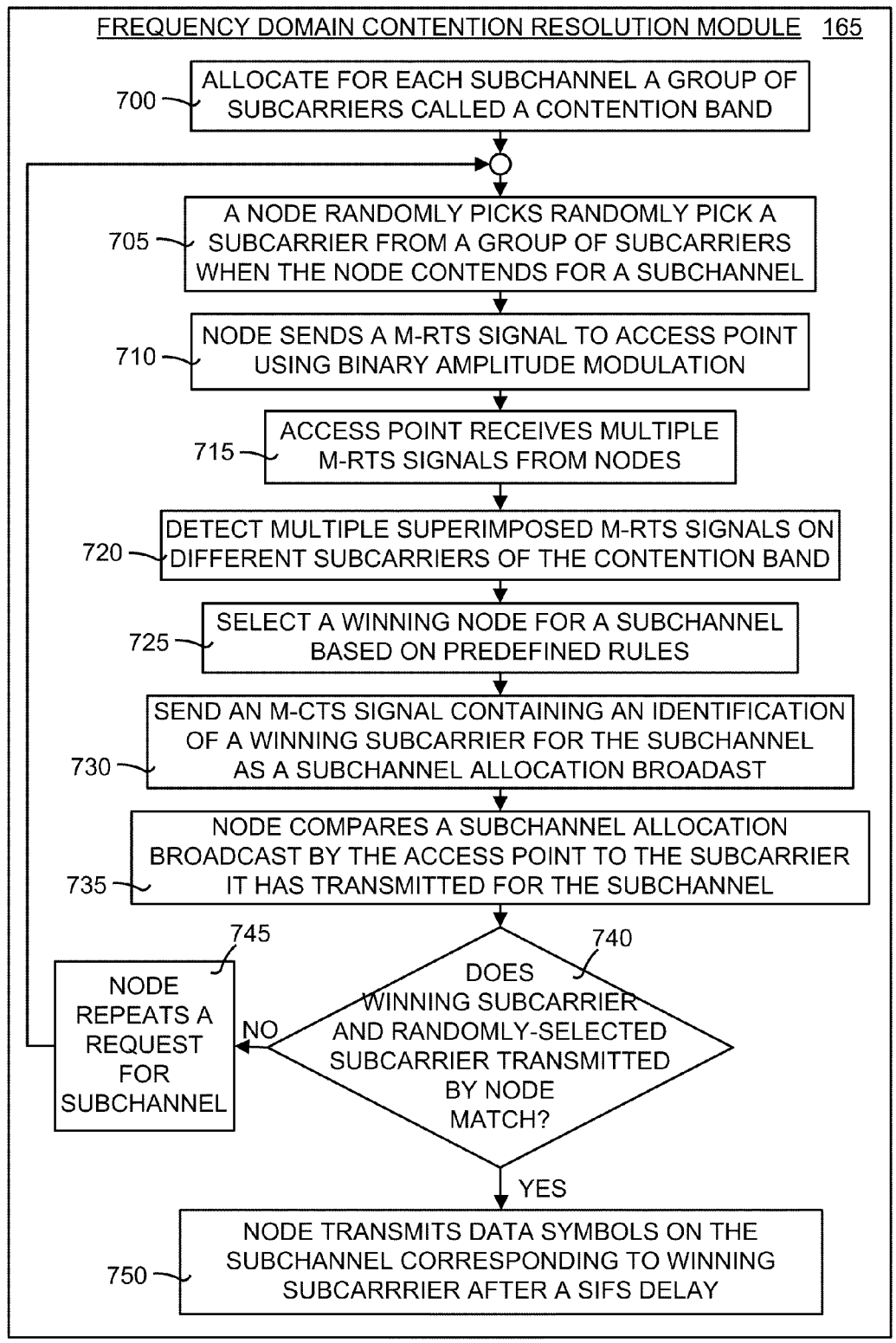
FIG. 7 is a flow diagram illustrating the operational details of embodiments of the frequency domain contention resolution module shown in FIG. 1.

FIG. 7 is a flow diagram illustrating the operational details of embodiments of the frequency domain contention resolution module 165 shown in FIG. 1. In general, the basic idea of frequency domain contention resolution works as follows. In M-RTS, a group of, say K, subcarriers are allocated for each subchannel, which is called a contention band (box 700). When a node contends for a subchannel, the node first randomly picks a subcarrier from the contention band (box 705). The node then sends a M-RTS signal to the AP 120 by using BAM (box 710). In some embodiments of the module 165 the signal sent is a "1."

The AP 120 receives multiple M-RTS signals from nodes (box 715). The AP 120 then detects the multiple signals that are superposed on different subcarriers of the contention band (box 720). The AP 120 may detect multiple ones on different subcarriers of the contention band. The AP 120 then selects a winning node for a subchannel based on predefined rules (box 725). In other words, embodiments of the module 165 can arbitrate a winning node by selecting a subcarrier based on some predefined rules (such as the one with highest frequency).

The AP 120 then sends a M-CTS signal containing an identification of the winning subcarrier for each subchannel as a subchannel allocation broadcast (box 730). After receiving the M-CTS signal, each node compares the subchannel allocation broadcast by the AP 120 to the subcarrier it has transmitted for the subchannel (box 735). A determination then is made as to whether the winning subcarrier and the randomly-selected subcarrier transmitted by the node match each other (box 740).

If there is no match, then node will repeat its request for a subchannel at a later time (box 745). In there is a match, then the node will transmit data symbols on that subchannel corresponding to the winning subcarrier box (box 750). This transmission is performed after a short interframe space (SIFS) delay, as specified in the IEEE 802.11 standard.

There are a few issues need to be considered in the frequency domain contention. First, the issue of what happens if two nodes transmit on the same contention subcarrier. It is very possible for two nodes to pick up the same random number and transmit on the same contention subcarrier. Thus, their transmitted energy is additive at the AP side. If the AP picks this subcarrier as the winner, a collision will happen since both nodes will consider themselves the winner and send data symbols on the same subchannel simultaneously. It is also possible (although the possibility is small) that two nodes' signals are destructive and cancel each other, so the AP may not be able to detect the transmissions. In this case the nodes involved will conclude that they were not allocated the subchannels they requested.

Second is the issue of how large is K? Clearly, a large K will have fewer collisions in a subchannel. However, a larger K also means more subcarriers are used and result in a larger signaling overhead. This is because more subcarriers need a larger FFT size and therefore a longer FFT period. Some embodiments of the fine-grained channel access system 100 and method set K=16, which is the initial contention window size in the IEEE 802.11 standard.

Third is the issue of who is responsible to return M-CTS. Any node that overhears the M-RTS transmissions can arbitrate the subchannel access. Simultaneous transmissions of M-CTS from different nodes are also allowed since, in a single broadcast domain, these M-CTS symbols are likely to have the same contention results and their energy is additive on each subcarrier. But it is still reasonable that only the potential receivers return M-CTS for M-RTS based on the following considerations: (1) the irrelevant nodes can be set to power-save mode, because it is unfair for them to spend power responding to M-RTS signals not for them; (2) it may unnecessarily create more exposed terminals if non-receiver nodes reply with M-CTS and block transmissions that could happen without interference.

One issue is how to specify a receiver in M-RTS. This is a non-trivial matter, since multiple nodes may transmit M-RTS simultaneously to different receivers and the receiver information may be mixed. Embodiments of the fine-grained channel access system 100 and method resolve this issue by using a membership vector of m subcarriers to present receiver information in M-RTS. Before transmitting M-RTS a node will hash the receiver's ID into a value between 0-(m−1). Then, the corresponding subcarrier will carry a "1" bit. Any node receiving M-RTS will check if the subcarrier corresponding to its ID has been set. If true, it returns a M-CTS. It is possible that multiple nodes have hash value collisions. But with a reasonably-sized m the number of station collisions remains small (2-3 in a typical WLAN setting), where one AP may be associated with several tens of stations. In some embodiments of the system 100 and method m is equal to 40 bits.

III.E. Frequency Domain Backoff Module

In embodiments of the fine-grained channel access system 100 and method, nodes will choose how many subchannels to request via contention based on their traffic requirements. If the traffic requirements are light, a node may choose fewer subchannels, while a heavily-loaded node may contend for as many as all subchannels for most efficient communication. However, if there are many nodes in a network contending for many subchannels, the collision avoidance mechanism provided by M-RTS/C-RTS may not be sufficient to represent all contenders since the number of subcarriers in the contention band is limited. One way to scale the ability to avoid collisions is to use multiple M-RTS symbols. But doing so will introduce more signaling overhead.

Figure 8:
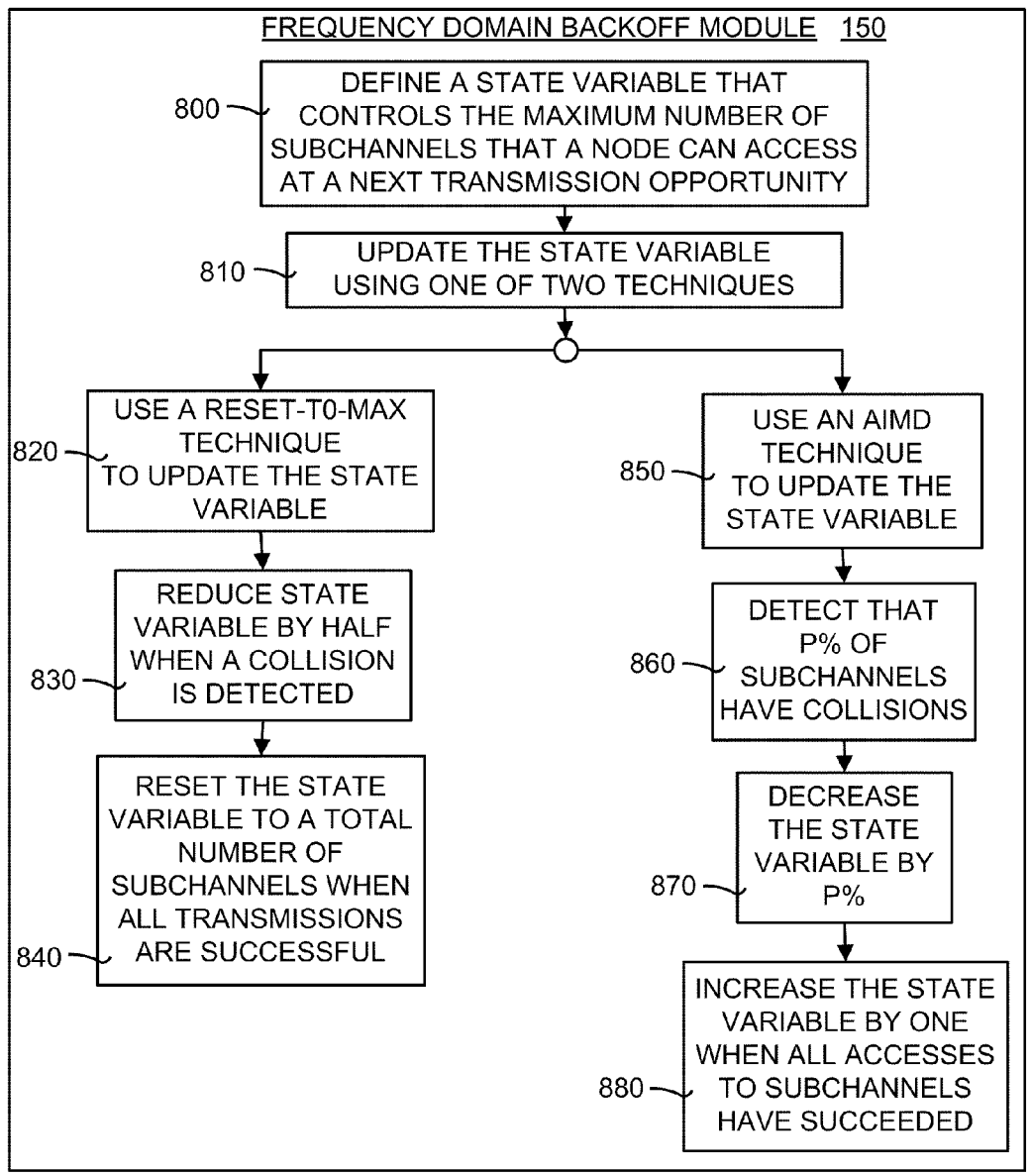
FIG. 8 is a flow diagram illustrating the operational details of embodiments of the frequency domain backoff module shown in FIG. 1.

Instead, embodiments of the system 100 and method use a novel frequency domain backoff technique to scale in a heavily-contented dense network. The basic idea is to control the maximal number of subchannels that one node can access based on the observed collision level. More specifically, FIG. 8 is a flow diagram illustrating the operational details of embodiments of the frequency domain backoff module 150 shown in FIG. 1.

Operation of embodiments of the frequency domain backoff module 150 begins by define a state variable, $C_{max}$, which controls the maximal subchannel the node can access in the next transmission opportunity (box 800). It should be noted that each node maintains a state variable. Thus, when the channel is idle for DIFS, a node may pick up to n subchannels to contend for, where n=min($C_{max}$, $I_{queue}$). In this case $I_{queue}$ is the number of fragments in the node's local sending queue.

Embodiments of the module 150 update the state variable, $C_{max}$, by using one of two techniques (box 810). This update technique used is based on the contention situation on the channel. There can be multiple update strategies. In a first embodiment of the module 150 a reset-to-max technique is used to update the state variable (box 820). This first embodiment emulates the behavior of the binary exponential backoff (BEB) used in the IEEE 802.11 standard. In particular, when a collision is detected on a subchannel that a node has transmitted on, embodiments of the module 153 will reduce $C_{max}$ by half (box 830). Once all transmissions are successful embodiments of the module 150 reset the state variable, $C_{max}$, to the total number of subchannels (box 840).

In second embodiment of the module 150 an additive increase/multiplicative decrease (AIMD) strategy is used to update the state variable (box 850). In this second embodiment, embodiments of the module 150 detect after transmission that p % of subchannels have collisions (box 860). Embodiments of the module 150 then decrease the state variable, $C_{max}$, by p %, which is a multiplicative decrease (box 870). This reaction is reasonable since p reflects an estimation on the contention level in all subchannels. And when all accesses to subchannels succeed embodiments of the module 150 increases the state variable, $C_{max}$, by one, which is an additive increase (box 880). It is straightforward to prove that both strategies converge if all contending nodes are within a single broadcasting domain.

III.F. Two-Way Traffic

This section discusses how embodiments of the fine-grained channel access system 100 and method schedule downlink traffic. Embodiments of the system 100 and method separate the uplink and downlink traffic by assigning different DIFS times to the AP and stations. The one with short DIFS has the priority to access the channel by sending M-RTS earlier.

To ensure fairness between uplink and downlink traffic, embodiments of the system 100 and method use a dynamic DIFS assignment strategy. In particular, a fixed DIFS time is assigned to all mobile stations and the AP has two different DIFS time settings. One is shorter than DIFS of mobile stations, and the other one is longer. The AP chooses a DIFS time based on the following rules. First, once an AP accesses the channel with a short DIFS, it will use the long DIFS for its next access. In addition, if an AP receives M-RTS from stations, it will use a short DIFS for its next access.

IV. Exemplary Operating Environment

Embodiments of the fine-grained channel access system 100 and method are designed to operate in a computing environment. The following discussion is intended to provide a brief, general description of a suitable computing environment in which embodiments of the fine-grained channel access system 100 and method may be implemented.

Figure 9:
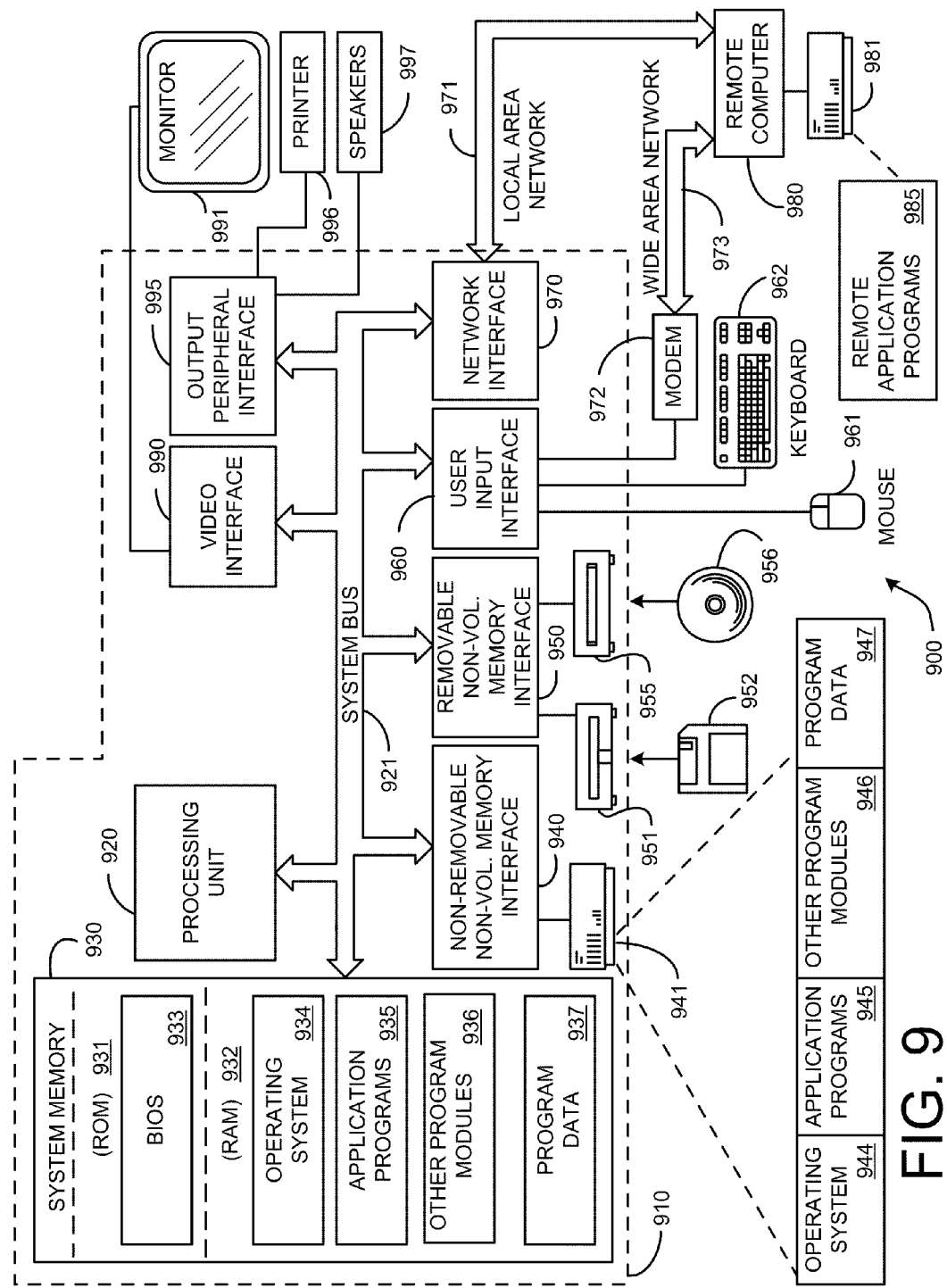
FIG. 9 illustrates an example of a suitable computing system environment in which embodiments of the fine-grained channel access system and method shown in FIGS. 1-8 may be implemented.

FIG. 9 illustrates an example of a suitable computing system environment in which embodiments of the fine-grained channel access system 100 and method shown in FIGS. 1-8 may be implemented. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment.

Embodiments of the fine-grained channel access system 100 and method are operational with numerous other general purpose or special purpose computing system environments or configurations. Examples of well known computing systems, environments, and/or configurations that may be suitable for use with embodiments of the fine-grained channel access system 100 and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Embodiments of the fine-grained channel access system 100 and method may be described in the general context of computer-executable instructions, such as program modules, being executed by a computer. Generally, program modules include routines, programs, objects, components, data structures, etc., that perform particular tasks or implement particular abstract data types. Embodiments of the fine-grained channel access system 100 and method may also be practiced in distributed computing environments where tasks are performed by remote processing devices that are linked through a communications network. In a distributed computing environment, program modules may be located in both local and remote computer storage media including memory storage devices. With reference to FIG. 9, an exemplary system for embodiments of the fine-grained channel access system 100 and method includes a general-purpose computing device in the form of a computer 910.

Components of the computer 910 may include, but are not limited to, a processing unit 920 (such as a central processing unit, CPU), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 910 typically includes a variety of computer readable media. Computer readable media can be any available media that can be accessed by the computer 910 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 910. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within the computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information (or data) into the computer 910 through input devices such as a keyboard 962, pointing device 961, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 920 through a user input interface 960 that is coupled to the system bus 921, but may be connected by other interface and bus structures, such as, for example, a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A wireless access point comprising:
   at least one processing unit; and
   at least one computer storage media storing computer readable instructions which, when executed by the at least one processing unit, cause the at least one processing unit to:
   detect a plurality of requests from a plurality of wireless nodes in a wireless local-area network to communicate over requested subchannels of a wireless channel having multiple subchannels, wherein the requests are detected by:
      comparing energy in subcarriers of the multiple subchannels to a threshold,
      identifying individual subcarriers for which the energy exceeds the threshold, and
      designating individual subchannels having the individual subcarriers for which the energy exceeds the threshold as the requested subchannels;
   assign different requested subchannels to different wireless nodes; and
   broadcast individual subchannel assignments to the different wireless nodes.

2. The wireless access point of claim 1, wherein the computer readable instructions cause the at least one processing unit to:
   detect the requests as amplitude-modulated signals on the individual subcarriers of the requested subchannels.

3. The wireless access point of claim 2, wherein the amplitude-modulated signals are binary amplitude-modulated signals.

4. The wireless access point of claim 1, wherein the computer readable instructions cause the at least one processing unit to:
   assign a particular subchannel of the requested subchannels to a first wireless node instead of a second wireless node, wherein the first wireless node requested the particular subchannel using a first subcarrier of the particular subchannel and the second wireless node requested the particular subchannel using a second subcarrier of the particular subchannel; and
   broadcast a corresponding subchannel assignment of the particular subchannel to the first wireless node by transmitting on the first subcarrier that was used by the first wireless node to request the particular subchannel.

5. The wireless access point of claim 1, wherein the computer readable instructions cause the at least one processing unit to:
   broadcast the individual channel assignments by transmitting a multi-tone clear-to-send signal to the different wireless nodes.

6. The wireless access point of claim 5, wherein the computer readable instructions cause the at least one processing unit to:
   perform amplitude modulation of at least some of the subcarriers of the requested subchannels to generate the multi-tone clear-to-send signal.

7. The wireless access point of claim 6, wherein the amplitude modulation is binary amplitude modulation.

8. The wireless access point of claim 1, wherein the wireless channel is a 20 megahertz channel.

9. The wireless access point of claim 8, wherein at least two of the requested subchannels are orthogonal to one another.

10. The wireless access point of claim 1, wherein the computer readable instructions cause the at least one processing unit to:
    use a first guard time and a second guard time to handle symbol time misalignment of asynchronous signaling and data transmission over the requested subchannels, where the first guard time and the second guard time are different from each other.

11. A wireless communication device comprising:
    at least one processing unit; and
    at least one computer storage media storing computer readable instructions which, when executed by the at least one processing unit, cause the at least one processing unit to:
    detect a first request from a first contending wireless node to communicate over a wireless subchannel in a wireless local area network, the first request comprising a first amplitude-modulated signal on a first subcarrier of the wireless subchannel;
    detect a second request from a second contending wireless node to communicate over the wireless subchannel in the wireless local area network, the second request comprising a second amplitude-modulated signal on a second subcarrier of the wireless subchannel; and
    resolve contention between the first contending wireless node and the second contending wireless node by:
       designating the first contending wireless node as a winning node and designating the second contending wireless node as a losing node; and
       broadcasting a subchannel assignment granting the wireless subchannel to the first contending wireless node.

12. The wireless communication device of claim 11, wherein the computer readable instructions cause the at least one processing unit to:
    assign another wireless subchannel to a third contending wireless node; and
    concurrently communicate data with both the first contending wireless node and the third contending wireless node using the wireless subchannel and the another wireless subchannel, respectively,
    wherein the wireless subchannel and the another wireless subchannel are part of the same wireless channel.

13. The wireless communication device of claim 11, wherein the computer readable instructions cause the at least one processing unit to:
    determine that another wireless subchannel is not requested when other subcarriers of the wireless subchannel do not include other amplitude-modulated signals,
    wherein the wireless subchannel and the another wireless subchannel are part of the same wireless channel.

14. The wireless communication device of claim 11, wherein the computer readable instructions cause the at least one processing unit to:
    broadcast the subchannel assignment by performing amplitude modulation on the first subcarrier of the wireless subchannel.

15. The wireless communication device of claim 11, embodied as a wireless access point.

16. A method comprising:
    performing frequency-domain detection of a plurality of tones indicating requests by a plurality of wireless nodes to communicate using a plurality of requested subchannels of a wireless channel, the requests being detected by identifying the tones in corresponding subcarriers of the requested subchannels;

assigning different requested subchannels to different wireless nodes of the plurality of wireless nodes, the different requested subchannels including a first requested subchannel assigned to a first wireless node for communicating in a wireless local area network and a second requested subchannel assigned to a second wireless node for communicating in the wireless local area network; and receiving first data from the first wireless node over the first requested subchannel and second data from the second wireless node over the second requested subchannel.

17. The method of claim 16, wherein the assigning comprises selecting the first wireless node as a winning node and designating a third wireless node as a losing node for the first requested subchannel.

18. The method of claim 17, wherein the first requested subchannel comprises a set of non-contiguous subcarriers.

19. The method of claim 17, wherein the requests include a first tone transmitted by the winning node on a first subcarrier of the first requested subchannel and another tone transmitted by the losing node on a second subcarrier of the first requested subchannel.

20. The method of claim 19, further comprising:

detecting the requests by comparing energy on the first subcarrier and the second subcarrier of the first requested subchannel to a threshold.

* * * * *